3,046,271
METAL-CONTAINING AZO DYESTUFFS
Fritz Suckfüll, Leverkusen, and Horst Nickel, Koln-Stammheim, Germany, assignors to Farbenfabriken Bayer Aktiengesellschaft, Leverkusen, Germany, a corporation of Germany
No Drawing. Filed Feb. 13, 1959, Ser. No. 792,969
Claims priority, application Germany July 23, 1957
12 Claims. (Cl. 260—143)

The present invention relates to metal-containing azo dyestuffs and to a process for their manufacture; more particularly it relates to copper complexes of azo dyestuffs having the formula

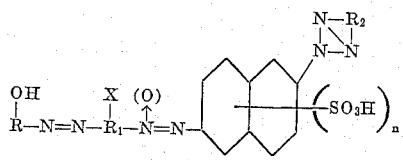

This application is a continuation-in-part application of copending applications Serial No. 747,125 and Serial No. 750,600, filed July 8, 1958, and July 24, 1958, respectively, now abandoned.

In this formula R represents the radical of a coupling component of the sulfonaphthalene, azosulfonaphthalene, sulfobenzene and pyrazolone series, containing the hydroxyl group in o-position to the azo bridge, $R_1$ denotes the radical of a benzene or naphthalene series in which the azo and/or azoxy bridges stand in the para- or amphi-position to one another and X in the o-position to the external azo bridge, X stands for a group capable of forming a copper complex, $R_2$ denotes the radical of a sulfonaphthalene coupling component bearing the nitrogen atoms in o-position to one another, and $n$ means the number 1 or 2.

The new azo dyestuffs are partially obtainable by coupling a diazotized 2-amino-6-nitronaphthalene-sulfonic acid with a sulfonaphthalene coupling component, containing an amino group, in the o-position to the amino group, converting the aminoazo dyestuff into the corresponding triazole compound, transforming in the latter the nitro group into an amino group, diazotizing and combining with an amino compound of the benzene or naphthalene series which contains in the o-position to the amino group a group capable of forming a copper complex or a radical which is converted into a group capable of forming a copper complex under the conditions of metallization, in such a manner that the coupling takes place in the p-position to the amino-group, further diazotizing and then combining with an azo component of the sulfonaphthalene, azosulfonaphthalene, sulfobenzene or pyrazolone series, coupling in the o-position to a hydroxyl group, and converting the dyestuff thus obtained into its copper complex compound by the action of copper-yielding agents.

Similar dyestuffs are obtained by starting from 2-acetyl-amino-6-aminonaphthalene-sulfonic acids, diazotizing and coupling, splitting off the acetyl group after triazolation and otherwise proceeding in a similar manner to that indicated above.

Further modes of carrying out the process consist in changing the sequence of the various reaction steps required. It is thus possible, for example, by starting from 2-amino-6-nitronaphthalene-sulfonic acid, to build up first the part of the molecule containing the copper complex by coupling with the aforesaid amino compound of the benzene or naphthalene series by further diazotizing, combining with an azo component of the defined type, coupling in the o-position to a hydroxyl group, and subsequent coppering, and then, after conversion of the nitro group into an amino group, diazotizing and coupling with a sulfo-naphthalene compound containing an amino group, in the o-position to the amino group, and effecting the triazolation.

A modification of the last-mentioned method consists in effecting the conversion into the metal complex as the last step subsequent to triazolation.

The conversion of the o-aminoazo dyestuffs into the corresponding triazole compounds takes place by methods known as such, for example by the action of ammoniacal cupric salt solutions or with sodium hypochlorite solution.

The conversion of the nitro group into an amino group may be effected with, for example, sodium sulfide or, in the case of the first-mentioned method of carrying out the process, with iron and acetic acid.

As groups forming copper complexes in the middle components of the benzene or naphthalene series employed, there are to be considered, for example, the hydroxyl group or the carboxyl group. Substituents which may be converted into a group forming metal complexes under the conditions of metallization are, for example, the alkoxy group or a halogen substituent. In the case of an alkoxy group, the coppering is carried out in known manner with the replacement of alkoxy by hydroxyl, and in the case of a halogen substitution also by known methods by exchange of the halogen substituent for hydroxyl. The radical in question may also be a hydrogen atom or a sulfonic acid group which may be converted into hydroxyl groups according to the methods of coppering by oxidation (German patent specifications Nos. 807,289, 889,196, 893,699 and 1,006,098).

Another part of the new dyestuffs is obtainable in that nitrotriazole compounds, obtainable by coupling of diazotized 2-amino-6-nitronaphthalene-sulfonic acids with sulfonaphthalene azo components, having an amino group, in the o-position to the amino group, and subsequent triazolizing, are reductively linked with the formation of an azo or azoxy group, with nitroazo dyestuffs obtainable by combining diazotized 2-amino-6-nitronaphthalene-sulfonic acids with azo components of the type

coupling in the o-position to the hydroxyl group, and subsequent oxidizing coppering.

When using, for example, equimolecular amounts of the nitrotriazole from diazotized 2-amino-6-nitronaphthalene-4,8-disulfonic acid and 2-aminonaphthalene-6-sulfonic acid, on the one hand, and the nitroazo dyestuff, coppered by oxidation, from the same diazo component and 2-hydroxynaphthalene-3,6-disulfonic acid, on the other hand, the reaction proceeds according to the following scheme:

the formaldehyde condensation products obtainable by the process of German patent specification No. 884,794.

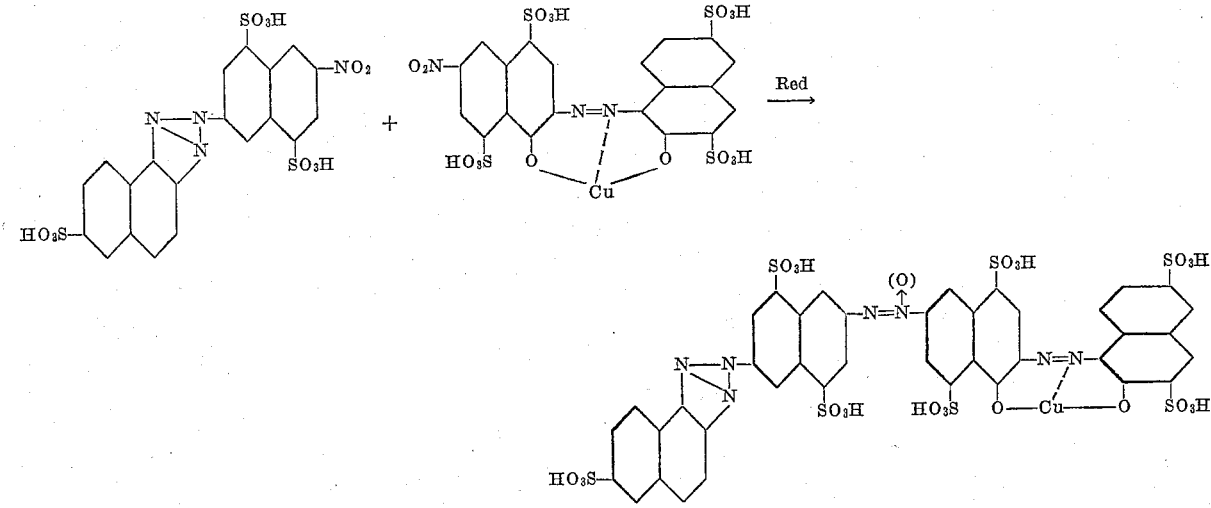

Other modes of carrying out the last mentioned process consist in modifying the sequence of the various reaction steps required such as coppering and triazolation. Similar dyestuffs are thus obtained by subjecting the non-triazolized o-aminoazo dyestuffs from diazotized 2-amino-6-nitronaphthalene-sulfonic acids and sulfonaphthalene azo components containing an amino group, together with the aforesaid nitroazo dyestuffs, coppered by oxidation, to a mixed reduction with subsequent triazolation. It is also possible to use the second component containing a nitro group in the metal-free form and to carry out the oxidizing coppering in the final step of the process.

The copper-containing intermediate or final products may be de-coppered in usual manner, for example by treatment with alkali metal sulfides and then again subjected on the fibre or in substance to the action of agents yielding copper or other metals such as nickel, cobalt, chromium or iron.

2-amino-6-nitronaphthalene-sulfonic acids suitable for the production of the new dyestuffs are for example 2-amino-6-nitronaphthalene-8-sulfonic acid and 2-amino-6-nitronaphthalene-4,8-disulfonic acid.

As sulfonaphthalene amino compounds capable of triazolation after coupling, there may be considered for example: 2-aminonaphthalene-4,5,6- or -7-monosulfonic acid, 2-aminonaphthalene-3,6-disulfonic acid, 1-aminonaphthalene-4-sulfonic acid.

Suitable middle components of the benzene or naphthalene series coupling in the p-position to the amino group and carrying in the o-position to the amino group the substituents required for metallisation are for example: aminobenzene, 2-methoxy-1-aminobenzene, 5-methyl-2-methoxy-1-aminobenzene, 1-aminonaphthalene, 1-aminonaphthalene-6-sulfonic acid, 2-chloro-1-aminonaphthalene-6-sulfonic acid, 2-ethoxy-1-aminonaphthalene-6-sulfonic acid.

As azo components coupling in the o-position to a hydroxyl group there may be mentioned: 1-hydroxynaphthalene-4-sulfonic acid, 2-hydroxynaphthalene-4-sulfonic acid, 2-hydroxynaphthalene-3,6-disulfonic acid, 1-chloro-2-acetylamino-5-hydroxynaphthalene-7-sulfonic acid, 1-acetylamino-8-hydroxynaphthalene-4-sulfonic acid, 1-phenyl-3-methyl-5-pyrazolone, 1-(4',8'-disulfonaphthyl-[2'])-3-methyl-5-pyrazolone, azo dyestuffs of the benzene and naphthalene series, coupling in o-position to a hydroxyl group, such as the azo dyestuff from diazotized 2-amino-1-chloro-5-hydroxynaphthalene-7-sulfonic acid and 2-hydroxynaphthalene-3,6-disulfonic acid, and the like.

As a reducing agent for the linkage of two components containing nitro groups there may be used glucose or The new dyestuffs dye fibres of natural or regenerated cellulose in chiefly green shades of excellent fastness to light, to wet processing and to acid.

The following examples are given for the purpose of illustrating the invention without, however, limiting it thereto; the parts by weight and the parts by volume standing in the ratio of grams to millilitres.

*Example 1*

(a) 55.1 parts by weight (0.1 mol) of the amino-triazole compound having the formula

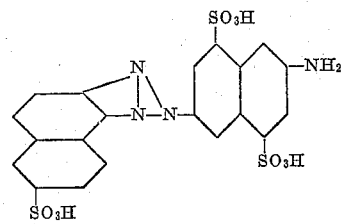

(I)

obtainable by coupling diazotized 2-amino-6-nitronaphthalene-4,8-disulfonic acid with 2-aminonaphthalene-6-sulfonic acid (triazole component), triazolation and reduction of the nitro group into the amino group, are dissolved in 800 parts by volume of weakly alkaline water and, after the addition of 69 parts by volume of a 10 percent sodium nitrite solution, diazotized at about 20° C. by running into 35 parts by volume of hydrochloric acid (d. 1.14) and 350 parts by volume of water. After completion of the diazotization, there are added 26.7 parts by weight of 1-amino-2-ethoxynaphthalene-6-sulfonic acid stirred in 100 parts by volume of water, and the mixture is brought to a pH value of about 4 by the addition of approximately 35 parts by volume of a 20 percent sodium acetate solution. After completion of the coupling, the coupling product is filtered off with suction and redissolved in soda-alkaline water.

The paste thus obtained is dissolved in 1400 parts by volume of hot water and diazotized at about 30° C. with 69 parts by volume of a 10 percent sodium nitrite solution by running into 100 parts by volume of hydrochloric acid (d. 1.14); the precipitated diazonium salt is then filtered off with suction. The paste thus obtained is introduced into a soda-alkaline solution of 30.4 parts by weight of 2-hydroxynaphthalene-3,6-disulfonic acid in 350 parts by volume of water and 140 parts by volume of a 20 percent sodium carbonate solution, and stirred at room temperature, until the coupling is completed. The precipitated dyestuff is isolated and converted into the copper complex compound according to usual methods by treating with copper salts. The dry dyestuff is a dark powder which dissolves in water with a green coloration and dyes cotton in green shades fast to light.

When the metallization is carried out with nickel salts instead of copper salts, a dyestuff is obtained which dyes cotton in bluish green shades.

(b) If the end component 2-hydroxynaphthalene-3,6-disulfonic acid is replaced by an equivalent amount of 1-hydroxy-8-acetylaminonaphthalene-5-sulfonic acid, while carrying out the final coupling in the presence of pyridine, a dyestuff is obtained which dyes cotton in yellowish green shades.

(c) If instead of 2-hydroxynaphthalene-3,6-disulfonic acid as an end coupling component, there is used the equivalent amount of the compounds indicated below, and proceeding in an analogous manner to that described above, dyestuffs are obtained which dye cotton in the shades listed in the following table:

| End coupling component | Shade of the copper-containing dyestuff on cotton |
|---|---|
| 2-hydroxynaphthalene-5-sulfonic acid | bluish geren. |
| 2-hydroxynaphthalene-6-sulfonic acid | Do. |
| 1-hydroxy-8-acetylaminonaphthalene-3,6-disulfonic acid | green. |

(d) If using as triazol component and as final coupling component the naphthalene derivatives listed in the following table valuable dyestuffs are also obtained which dye cotton in shades as mentioned below.

| Triazol component | End coupling component | Shade of the copper-containing dyestuff on cotton |
|---|---|---|
| 2-aminonaphthalene-6-sulfonic acid. | 1 hydroxynaphthalene-4-sulfonic acid. | green. |
| Do | 1-hydroxynaphthalene-3,8-disulfonic acid. | Do. |
| 2-aminonaphthalene-5-sulfonic acid. | 2-hydroxynaphthalene-3,6-disulfonic acid. | bluish green. |
| Do | 2-hydroxynaphthalene-5,7-disulfonic acid. | green. |
| Do | 1-hydroxynaphthalene-4,8-disulfonic acid. | Do. |
| Do | 1-hydroxy-8-acetylaminonaphthalene-5-sulfonic acid. | yellowish green. |
| 2-aminonaphthalene-7-sulfonic acid. | 2-hydroxynaphthalene-3,6-disulfonic acid. | bluish green. |
| Do | 1-hydroxy-8-acetylaminonaphthalene-5-sulfonic acid. | green. |
| 2-aminonaphthalene-3,6-disulfonic acid. | 2-hydroxynaphthalene-5-sulfonic acid. | bluish green. |
| Do | 2-hydroxynaphthalene-6-sulfonic acid. | Do. |
| Do | 1-hydroxy-8-acetylaminonaphthalene-5-sulfonic acid. | yellowish green. |
| Do | 1-hydroxy-8-benzoylaminonaphthalene-5-sulfonic acid. | Do. |
| Do | 1-chloro-2-acetylamino-5-hydroxynaphthalene-7-sulfonic acid. | bluish green. |
| 1-aminonaphthalene-4-sulfonic acid. | 2-hydroxynaphthalene-3,6-disulfonic acid. | Do. |
| Do | 1-hydroxy-8-acetylaminonaphthalene-5-sulfonic acid. | yellowish green. |

(e) If replacing in the dyestuff of Example 1(a) the middle component 1-amino-2-ethoxynaphthalene-6-sulfonic acid by the equivalent amount of 1-amino-2-ethoxynaphthalene-7-sulfonic acid a dyestuff is obtained which dyes cotton in green shades.

(f) One obtains a valuable dyestuff the copper complex of which dyes cotton in fast green shades, if in this example instead of the aminotriazol compound of the Formula I is used the equivalent amount of the aminotriazol compound prepared by coupling diazotized 2-amino-6-nitronaphthalene-8-sulfonic acid with 2-aminonaphthalene-3,6-disulfonic acid, triazolation and reduction of the nitro group in the compound thus obtained, further diazotization, coupling with 1-amino-2-ethoxynaphthalene-6-sulfonic acid, again diazotization and finally coupling with 1-hydroxy-8-acetylaminonaphthalene-5-sulfonic acid.

Example 2

55.1 parts by weight (0.1 mol) of the amino-triazole compound (I) are diazotized as described in Example 1 and, after completion of the reaction, combined with 22.3 parts by weight of 1-aminonaphthalene-6-sulfonic acid dissolved in 350 parts by volume of water, and the coupling is completed in an acetic acid medium and the product isolated.

The paste thus obtained is stirred in 1100 parts by volume of water, 69 parts by volume of a 10 percent sodium nitrite solution are added, and diazotized at about 10° C. by running the mixture into 42 parts by volume of hydrochloric acid (d. 1.14) diluted with 50 parts by volume of water. After the diazotization is completed, the diazonium salt is filtered off with suction. With the diazonium salt paste thus obtained there is combined after the addition of 140 parts by volume of a 20 percent sodium carbonate solution the soda-alkaline solution of 30.4 parts by weight of 2-hydroxynaphthalene-3,6-disulfonic acid in 350 parts by volume of water and completely coupled at 0° C., then salted out with sodium chloride and isolated.

The dyestuff paste thus obtained is stirred in 2100 parts by volume of water, rendered weakly acid with acetic acid and treated with 140 parts by volume of a 20 percent sodium acetate solution and a solution of 25 parts by weight of crystalline copper sulfate in 130 parts by volume of water. After heating to 60° C., about 280 parts by volume of 3 percent hydrogen peroxide are added dropwise to the solution within 3 hours, until the oxidizing coppering is completed. The dyestuff thus coppered by oxidation is salted out with sodium chloride and isolated. After drying, it is a dark powder which dissolves in water with a green coloration and dyes cotton in green shades.

If instead of 1-aminonaphthalene-6-sulfonic acid, an equivalent amount of 2-chloro-1-aminonaphthalene-7-sulfonic acid is used and the coppering is effected by boiling with a tartrate-containing copper salt solution in an alkaline medium, dyestuffs yielding on cotton green dyeings of a similar shade are obtained.

Example 3

A neutral solution of 63.1 parts by weight (0.1 mol) of the amino-triazole compound of the formula

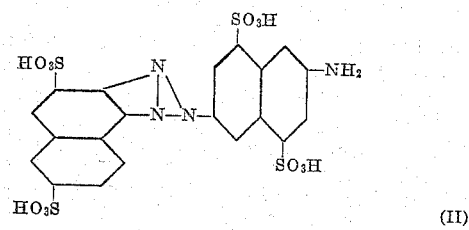

(II)

in 700 parts by volume of water is diazotized similarly to the instructions of Example 1, coupled with 13.7 parts by weight of 1-methyl-3-amino-4-methoxybenzene in an acetic acid medium at 0° C., and the monoazo compound thus obtained is isolated.

The paste thus obtained is dissolved in 1400 parts by volume of water and diazotized at 25° C. with 69 parts by volume of a 10 percent sodium nitrite solution by running into 42 parts by volume of hydrochloric acid (d. 1.14) and 50 parts by volume of water. After completion of the diazotization, a solution of 30.4 parts by weight of 2-hydroxynaphthalene-3,6-disulfonic acid in 350 parts by volume of water is added, coupling is completed in a soda-alkaline medium and the product is isolated. The dyestuff paste thus obtained is after-treated with copper salts in usual manner.

The dry coppered dyestuff is a dark powder which dissolves in water with a blue coloration and dyes cotton in a greenish blue-grey shade.

If instead of 2-hydroxynaphthalene-3,6-disulfonic acid an equivalent amount of 1-(4'-sulfophenyl)-3-methylpyrazolone-(5) is used, a dyestuff is obtained which dyes cotton in violetish brown shades.

Example 4

100 parts by weight of cotton are introduced at room temperature into a dyebath containing in 5000 parts by volume of water, 2 parts by weight of the dyestuff obtainable according to Example 1, 1 part by weight of sodium carbonate and 20 parts by weight of sodium sulfate. The dyebath is heated to 90–95° C. within about half an hour and kept at 95° C. for half an hour. The cotton material is then rinsed and dried. A green dyeing is thus obtained which possesses very good fastness to light.

Example 5

If in Example 3 the middle component 1-methyl-3-amino-4-methoxybenzene is replaced by the equivalent amount of 2-aminobenzene-1-carboxylic acid and if as final coupling component 2-hydroxynaphthalene-3,6-disulfonic acid is used a dyestuff can be obtained which dyes cotton in reddish brown shades.

When the diazotized aminotriazol compound which was prepared from 2-amino-6-nitronaphthalene-4,8-disulfonic acid by coupling with 2-aminonaphthalene-5-sulfonic acid and subsequent reduction of the nitro group, was coupled with 2-aminobenzene-1-carboxylic acid in p-position to the amino group and after further diazotization again coupled with 2-hydroxynaphthalene-3,6-disulfonic acid or 1-hydroxy-7-acetylaminonaphthalene-3-sulfonic acid or 1-hydroxy-7-phenylaminonaphthalene-3-sulfonic acid a dyestuff was obtained which after coppering dyes cotton in reddish brown to dark brown shades.

Example 6

58.1 parts by weight (0.1 mol) of the nitro-triazole compound having the formula

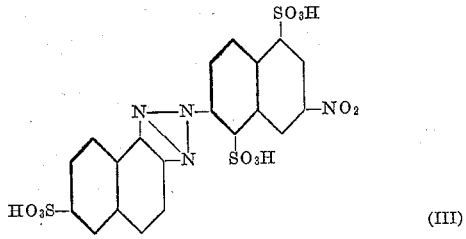

(III)

obtaintable by coupling diazotized 2-amino-6-nitronaphthalene-4,8-disulfonic acid with 2-aminonaphthalene-6-sulfonic acid (triazole component) and subsequent triazolizing, are stirred neutral in 3500 parts by volume of water and combined with a neutral solution of the copper complex compound from 68.0 parts by weight (0.1 mol) of the nitro-monoazo dyestuff of the formula

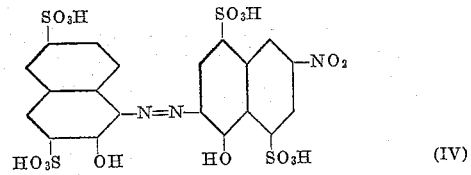

(IV)

obtainable by coupling diazotized 2-amino-6-nitronaphthalene-4,8-disulfonic acid with 2-hydroxynaphthalene-3,6-disulfonic acid (azo component) and oxidizing coppering, in 1750 parts by volume of water. After the addition of 400 parts by volume of a 40 percent sodium hydroxide solution and a solution of 34.5 parts by weight of glucose in 180 parts by volume of water, the reaction mixture is slowly heated to about 60° C. and kept at this temperature, until the reductive linkage is terminated; the product is then salted out with sodium chloride and isolated as usual.

The dry dyestuff is a dark powder which dissolves in water with a green coloration and dyes cotton in green shades.

If the triazole component of the nitro-triazole compound (III) or the azo component of the copper complex of the nitro-monoazo compound (IV) is replaced by an equivalent amount of the components listed in the following table, dyestuffs are obtained which dye cotton in the shades given below.

| Triazole component | Azo component | Shade of the copper-containing dyestuff on cotton |
|---|---|---|
| 2-aminonaphthalene-6-sulfonic acid. | 1-chloro-2-acetylamino-5-hydroxynaphthalene-7-sulfonic acid. | green. |
| 2-aminonaphthalene-3,6-disulfonic acid. | 2-hydroxynaphthalene-3,6-disulfonic acid. | bluish green. |
| 1-aminonaphthalene-4-sulfonic acid. | 1-hydroxynaphthalene-4-sulfonic acid. | bluish green. |
| 2-aminonaphthalene-5-sulfonic acid. | ----do----- | Do. |
| Do. | 2-hydroxynaphthalene-3,6-disulfonic acid. | green. |
| Do. | 1-hydroxybenzene-4-sulfonic acid. | olive. |
| 2-aminonaphthalene-6-sulfonic acid. | 1-hydroxynaphthalene-4-sulfonic acid. | bluish green. |
| Do. | 1-hydroxybenzene-4-sulfonic acid. | olive. |

Example 7

If the copper complex compound of the nitro-monoazo dyestuff (IV) is replaced in Example 6 by an equivalent amount of the copper complex compound of the formula

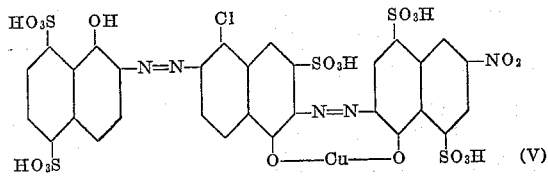

(V)

obtainable for example by saponification of the oxidatively coppered dyestuff 2-amino-6-nitronaphthalene-4,8-disulfonic acid → 1-chloro-2-acetylamino-5-hydroxynaphthalene-7-sulfonic acid, diazotizing and coupling with 2-hydroxynaphthalene-3,6-disulfonic acid, and proceeding in an analogous manner to that described in Example 6 with, if desired, subsequent coppering in an alkaline medium with the exchange of chlorine, a dyestuff is obtained which dyes cotton in green shades.

Example 8

58.3 parts by weight (0.1 mol) of the monoazo dyestuff obtainable by coupling diazotized 2-amino-6-nitronaphthalene-4,8-disulfonic acid with 2-aminonaphthalene-6-sulfonic acid (triazole component), and 74.8 parts by weight (0.11 mol) of the copper complex compound of the nitromonoazo dyestuff (IV) of Example 6 are dissolved in 4850 parts by volume of water. After the addition of 360 parts by volume of a 40 percent sodium hydroxide solution and a solution of 34.5 parts by weight of glucose in 180 parts by volume of water, the reaction mixture is slowly heated to about 60° C. and kept at this temperature, until the reductive linkage is completed.

The dyestuff separated with sodium chloride and isolated is then re-dissolved in 3000 parts by volume of water and boiled with an ammoniacal solution of 55 parts by weight of crystalline copper sulfate in 300 parts by volume of water, until the triazolation is completed. The dyestuff, isolated as usual and dried, is a dark powder which dissolves in water with a green coloration and dyes cotton in green shades.

A similar dyestuff is obtainable by using, instead of glucose, a corresponding amount of the formaldehyde condensation product obtainable according to German patent specification No. 884,794.

If instead of 2-hydroxynaphthalene-3,6-disulfonic acid as an azo component of the copper complex compound of the nitro compound (IV), there is used the equivalent amount of the compounds listed below and proceeding in a similar manner to that described above, dyestuffs are obtained which dye cotton in the shades given in the following table.

| Azo component | Shade of the copper-containing dyestuff on cotton |
|---|---|
| 1-(4',8'-disulfonaphthyl-[2'])-3-methylpyrazolone-5 | greyish green. |
| 1-chloro-2-acetylamino-5-hydroxynaphthalene-7-sulfonic acid. | green. |
| 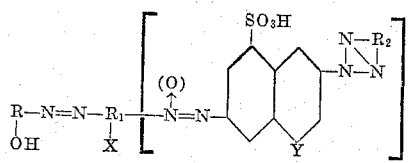 | green. |

We claim:

1. A copper complex compound of an azo dyestuff having the formula

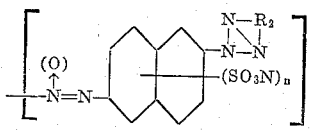

wherein Y is a member selected from the group consisting of H and SO₃H; wherein R is a radical of a coupling component selected from the class consisting of the sulfonaphthalene, azosulfonaphthalene, sulfobenzene and pyrazolone series, bearing the hydroxyl group in o-position to the azo bridge; R₁ is a radical selected from the group consisting of the benzene and naphthalene series bearing

in p-position, with respect to the azo bridge between R and R₁, when

is an azo bridge, and bearing

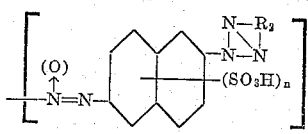

in amphi-position with respect to the azo bridge between R and R₁ when

is a member selected from the group consisting of an azo bridge and any azoxy bridge; X stands in o-position to the external azo bridge and is a group which is capable of forming a copper complex in combination with the hydroxyl group in R; R₂ is a radical of a sulfonaphthalene coupling component bearing the nitrogen atoms in o-position to one another; and n is one of the integers 1 and 2.

2. A copper complex compound of an azo dyestuff having the formula

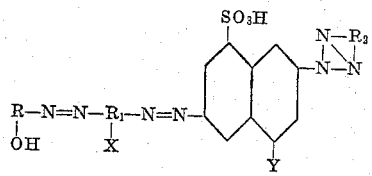

wherein Y is a member selected from the group consisting of H and SO₃H; wherein R is a radical of the sulfonaphthalene series, R₁ is a radical of the sulfonaphthalene series containing the azo bridges in para-position to each other, R₂ is a radical of the sulfonaphthalene series, X is a hydroxyl group and n is an integer from 1 to 2.

3. A copper complex compound of an azo dyestuff having the formula

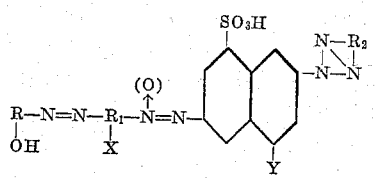

wherein Y is a member selected from the group consisting of H and SO₃H; wherein R is a radical of the sulfonapthalene series, R₁ is a radical of the sulfonaphthalene series containing the azo bridges in amphi-position to each other, R₂ is a radical of the sulfonaphthalene series, X is a hydroxyl group and n is an integer from 1 to 2.

4. A copper complex azo dyestuff of the formula

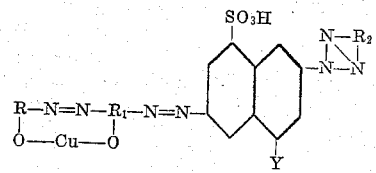

wherein Y is a member selected from the group consisting of H and SO₃H; wherein R means the radical of a coupling component selected from the class consisting of the sulfonaphthalene, azosulfonaphthalene, sulfobenzene and pyrazolone series, bearing the —O—Cu— group in o-position to the azo bridge, R₁ stands for a member selected from the group consisting of the radical of an amino compound of the benzene and naphthalene series, said radical containing the azo bridges in p-position to each other and the —O—Cu— group in o-position to the external azo bridge, R₂ means the radical of a sulfonaphthalene coupling component bearing the nitrogen atoms in o-position to one another, and n means one of the numbers 1 and 2.

5. A copper complex azo dyestuff of the following formula

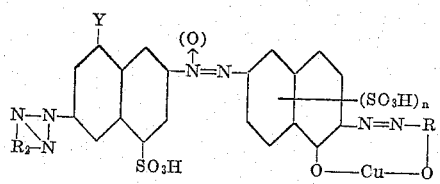

wherein Y is a member selected from the group consisting of H and SO₃H; wherein R₂ represents the radical of a sulfonaphthalene coupling component containing the nitrogen atoms in o-position to one another, R stands for the radical of a coupling component selected from the group consisting of the sulfonaphthalene, azosulfonaphthalene, sulfobenzene and pyrazolone series containing the —O—Cu— group in o-position to the azo bridge, and n stands for one of the numbers 1 and 2.

6. The copper-containing disazo dyestuff corresponding to the formula

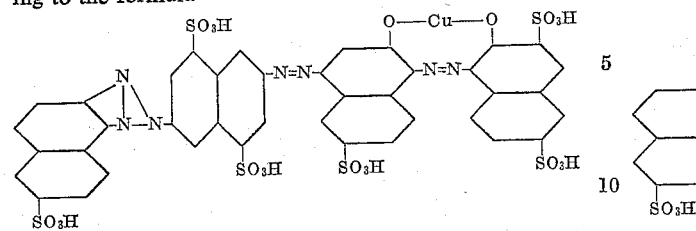

7. The copper-containing disazo dyestuff corresponding to the formula

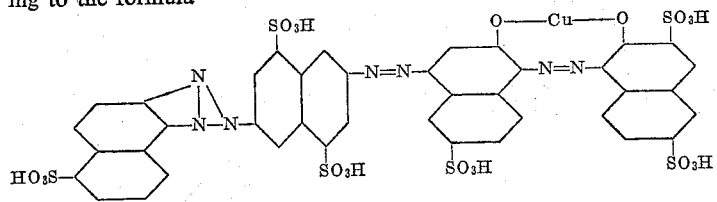

8. The copper-containing disazo dyestuff corresponding to the formula

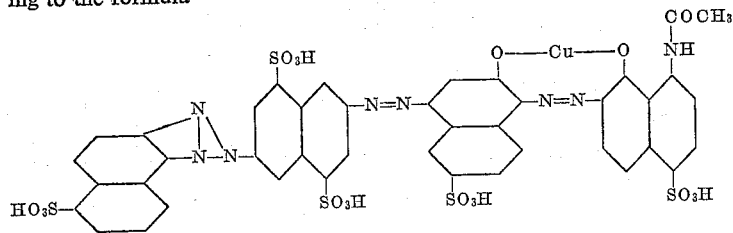

9. The copper-containing disazo dyestuff corresponding to the formula

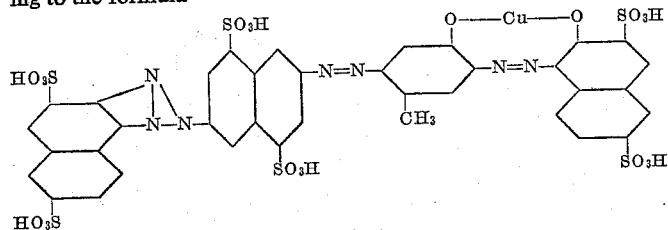

10. The copper-containing disazo dyestuff corresponding to the formula

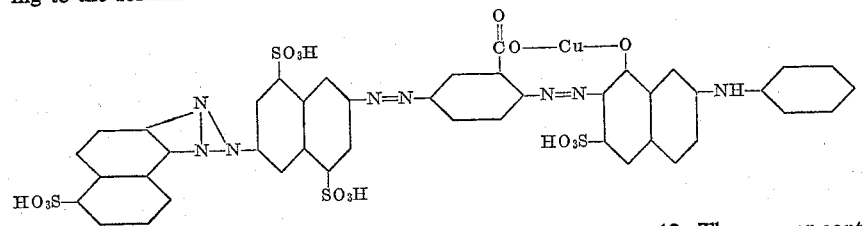

11. The copper-containing disazo dyestuff of the formula

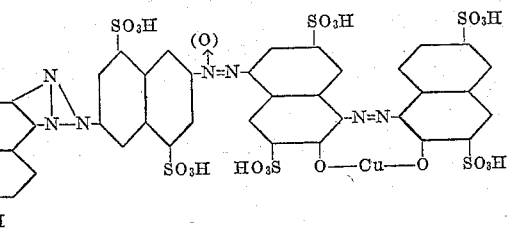

12. The copper-containing disazo dyestuff of the formula

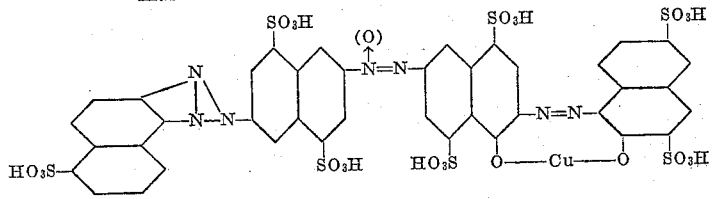

References Cited in the file of this patent
UNITED STATES PATENTS
2,212,816    Schultis et al. _____ Aug. 27, 1940

UNITED STATES PATENT OFFICE
CERTIFICATE OF CORRECTION

Patent No. 3,046,271                            July 24, 1962

Fritz Suckfüll et al.

It is hereby certified that error appears in the above numbered patent requiring correction and that the said Letters Patent should read as corrected below.

Column 7, lines 41 to 50, the structural formula should appear as shown below instead of as in the patent:

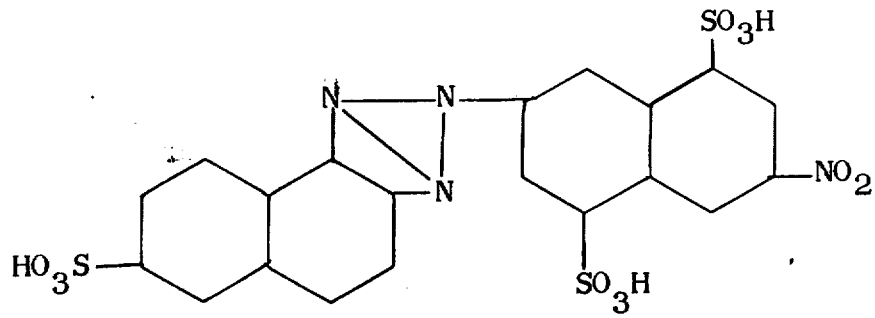

Signed and sealed this 27th day of November 1962.

(SEAL)
Attest:   ESTON G. JOHNSON

Attesting Officer                                  DAVID L. LADD
                                                                  Commissioner of Patents